No Printed Specification Available
8135X
T. STAGNER.
TRUSS.
Patented Apr. 5, 1834.
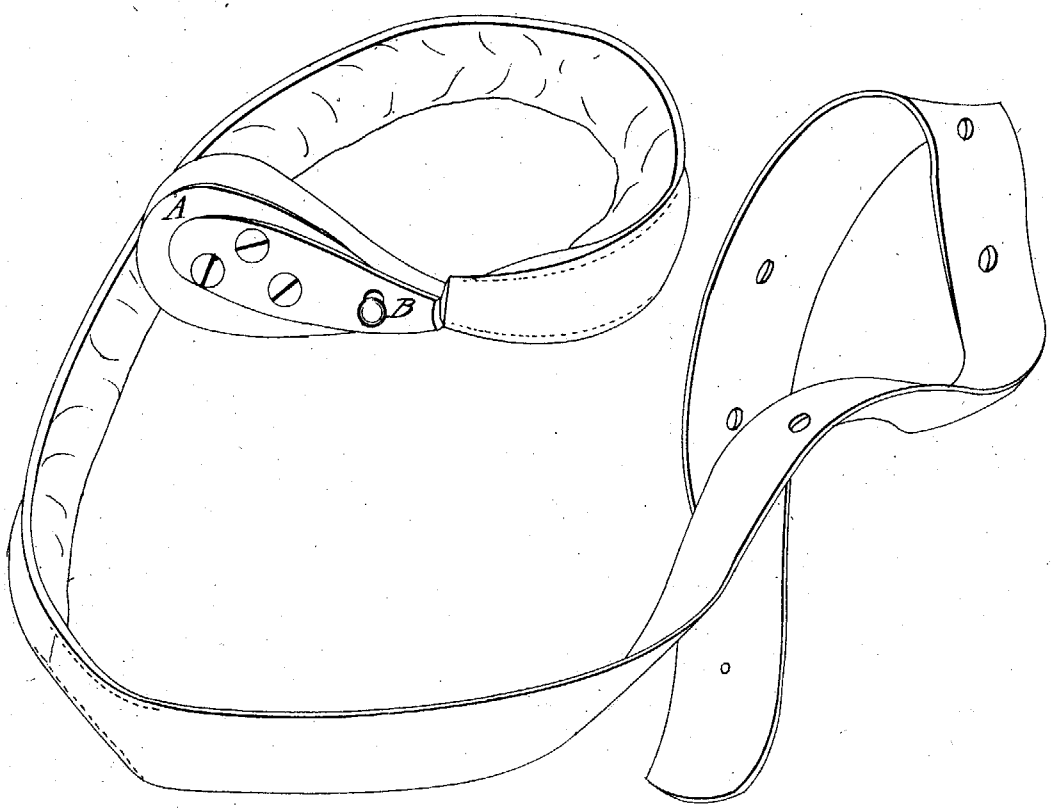

8135X

Thomas Stagner

The Schedule referred to in these Letters Patent
and making part of the same containing a descrip-
tion in the words of the said Thomas Stagner him=
self of his improvement in the instrument and in the
application of the same for the cure of all the various
kinds of Hernia.

To all to whom these presents shall come,
Be it known that I Thomas Stagner of the
County of Madison in the State of Kentucky
have invented a new and usefull instrument and
discovered themode of applying the same to the cure
of all the various kinds of Hernia. and that the
following is a full and exact description of the
construction and opperation of the said instrument
and of the manner of applying the same as invented
and discovered by me, X The rupture head is of
soft wood, half oval in its shape, this is connected
by its plain surface with screws to a piece of iron adapted
in shape to the plain surface of the half oval head — on
the surface of this iron opposite that for the attachment of
the rupture head, there is a hook the purpose of which
will be explained hereafter by rivets the neck of the
iron on which the rupture head is placed articulates
with an elastic spring made of Crawley or German
steel, of sufficient length to extend two thirds around
the pelvis, the width of the spring decreases from
its articulating to its other extremity, this spring
is covered with strong thin leather and its concave sur-
face is padded and lined to prevent its abrading
the external integument, the same strips of leather
with which the instrument is wound is continued
around the remainder of the pelvis. and has holes in it
near

[illegible]

8135X near the extremity for fastening it to the truss above mentioned, about one third of the distance from the rupture head, to the small end of the elastic spring is attached a strap of sufficient length to pass from the superior anterior spinous process of the illium around the exterior posterior and internal surface of the thigh to the same point of the ilium from which it commences. In applying this instrument the rupture head is fixed immediately over the opening through which which the hernia has protruded. The shape of that portion of the spring between the head and the strap is such as to prevent its pressing on the pelvis, Immediately beyond the strap it fits very closely and firmly upon the pelvis, and the remainder of the spring touches but slightly except at its small extremity which pressing closely on the ilium immediately below the superior anterior spinous process —

The strap is intended to preserve the instrument in the situation above described which it will retain in nineteen cases out of twenty without the employment of the strap. The instrument may be varied in size to suit every patient. It may be required upon what principle it produces its effects; it is this, the peculiar shape of the rupture head draws together the lacerated fibers of the external and internal abdominal rings, and by its pressure excites in them inflamation which causes the lacerated fibers to unite. The peculiar action of its spring preserves it in a fixed position enabling the patient to attend to his ordinary vocations while the cure is effecting H. B. Wilkeson
[illegible] W. H. Carpenter
Thomas Wagner
[illegible] 37[illegible]